US011495124B2

(12) United States Patent
Lau et al.

(10) Patent No.: US 11,495,124 B2
(45) Date of Patent: Nov. 8, 2022

(54) TRAFFIC PATTERN DETECTION FOR CREATING A SIMULATED TRAFFIC ZONE EXPERIENCE

(71) Applicants: AT&T Intellectual Property I, L.P., Atlanta, GA (US); AT&T Mobility II LLC, Atlanta, GA (US)

(72) Inventors: Erie Lai Har Lau, Redmond, WA (US); Reza Hussain Hussaini, Redmond, WA (US); Hendrawan Susanto, Issaquah, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 190 days.

(21) Appl. No.: 16/692,441

(22) Filed: Nov. 22, 2019

(65) Prior Publication Data
US 2021/0158690 A1    May 27, 2021

(51) Int. Cl.
*G08G 1/01*    (2006.01)
*G08G 1/0967*    (2006.01)
(Continued)

(52) U.S. Cl.
CPC ....... *G08G 1/0112* (2013.01); *G01C 21/3492* (2013.01); *G06T 19/006* (2013.01);
(Continued)

(58) Field of Classification Search
CPC .. G08G 1/0112; G08G 1/0129; G08G 1/0133; G08G 1/0141; G08G 1/096775; G01C 21/3492; G06T 19/006
See application file for complete search history.

(56) References Cited

U.S. PATENT DOCUMENTS

| 5,660,547 A | * | 8/1997 | Copperman | G09B 9/05 |
| | | | | 434/62 |
| 6,317,686 B1 | * | 11/2001 | Ran | G08G 1/0141 |
| | | | | 73/178 R |

(Continued)

FOREIGN PATENT DOCUMENTS

| CN | 102509365 A | * | 6/2012 | ......... G01N 33/0063 |
| CN | 110346518 A | * | 10/2019 | ......... G01N 33/0063 |

(Continued)

OTHER PUBLICATIONS

Abdi et al.,"In-Vehicle Augmented Reality Traffic Information System: A New Type of Communication Between Driver and Vehicle", Article in Procedia Computer Science, Dec. 2015, pp. 242-249.

(Continued)

*Primary Examiner* — Luis A Martinez Borrero
(74) *Attorney, Agent, or Firm* — Amin, Turocy & Watson, LLP

(57) ABSTRACT

The described technology is generally directed towards generating a simulated virtual experience that represents predicted interaction of a user/vehicle with traffic in a traffic zone. A user who is considering entering a traffic zone (e.g., that charges a fee for usage) can request a simulated virtual experience of what is likely to occur if the user decides to enter. Based on the simulated virtual experience, which can be a graphical visualization in 3D, the user can make an informed decision as to whether to enter and pay, or not enter. User-specific data such as user preferences and other provided criterion can be used with respect to generating the simulated virtual experience. For current users about to enter the zone, current traffic data is used along with historical data in generating the simulated virtual experience.

20 Claims, 11 Drawing Sheets

(51) Int. Cl.
*G06T 19/00* (2011.01)
*G01C 21/34* (2006.01)

(52) U.S. Cl.
CPC ......... *G08G 1/0129* (2013.01); *G08G 1/0133* (2013.01); *G08G 1/0141* (2013.01); *G08G 1/096775* (2013.01)

(56) References Cited

U.S. PATENT DOCUMENTS

| | | | | |
|---|---|---|---|---|
| 6,705,521 | B1* | 3/2004 | Wu | G07B 15/063 379/355.06 |
| 7,127,413 | B1 | 10/2006 | Yanagisawa et al. | |
| 7,155,376 | B2* | 12/2006 | Yang | G08G 1/0129 701/532 |
| 7,181,414 | B1* | 2/2007 | Ogawa | G07B 15/063 701/1 |
| 7,274,311 | B1* | 9/2007 | MacLeod | G08G 1/096716 340/995.13 |
| 7,860,639 | B2* | 12/2010 | Yang | G08G 1/081 701/1 |
| 7,865,391 | B2* | 1/2011 | Martinez-Olague | G07B 15/063 701/13 |
| 8,566,010 | B2* | 10/2013 | Sarma | G08G 1/0133 701/423 |
| 8,718,910 | B2* | 5/2014 | Gueziec | G08G 1/0112 701/119 |
| 8,903,646 | B2* | 12/2014 | Althen | G06Q 99/00 701/411 |
| 9,652,888 | B1* | 5/2017 | Johnson | G08G 5/0013 |
| 10,768,629 | B2* | 9/2020 | Song | G06N 3/0472 |
| 2002/0198694 | A1* | 12/2002 | Yang | G08G 1/0129 703/6 |
| 2004/0143385 | A1* | 7/2004 | Smyth | G08G 1/0116 701/117 |
| 2005/0086100 | A1 | 4/2005 | Yanagisawa et al. | |
| 2006/0129315 | A1* | 6/2006 | Kanematsu | G01C 21/3461 340/995.19 |
| 2006/0155427 | A1* | 7/2006 | Yang | G08G 1/07 701/1 |
| 2007/0093997 | A1* | 4/2007 | Yang | G06F 30/20 703/8 |
| 2007/0225912 | A1 | 9/2007 | Grush | |
| 2007/0271079 | A1* | 11/2007 | Oguchi | H04B 17/3912 703/8 |
| 2010/0070253 | A1* | 3/2010 | Hirata | G08G 1/0104 703/8 |
| 2010/0076878 | A1 | 3/2010 | Burr et al. | |
| 2010/0097240 | A1* | 4/2010 | Soulchin | G08G 1/0969 340/905 |
| 2010/0134320 | A1 | 6/2010 | Chevion et al. | |
| 2010/0225644 | A1* | 9/2010 | Swope, III | G06T 13/00 382/104 |
| 2011/0106370 | A1 | 5/2011 | Duddle et al. | |
| 2012/0109506 | A1* | 5/2012 | Fei | G08G 1/0116 701/118 |
| 2014/0278052 | A1* | 9/2014 | Slavin | G01C 21/3492 701/400 |
| 2014/0310075 | A1 | 10/2014 | Ricci | |
| 2015/0088618 | A1* | 3/2015 | Basir | G07B 15/063 701/1 |
| 2015/0120455 | A1 | 4/2015 | McDevitt et al. | |
| 2015/0242944 | A1 | 8/2015 | Willard et al. | |
| 2015/0319093 | A1* | 11/2015 | Stolfus | H04L 43/062 370/237 |
| 2017/0011559 | A1 | 1/2017 | Graham et al. | |
| 2017/0091350 | A1* | 3/2017 | Bauer | G06F 30/15 |
| 2018/0203455 | A1* | 7/2018 | Cronin | G01C 21/3461 |
| 2018/0309592 | A1* | 10/2018 | Stolfus | H04L 47/122 |
| 2018/0349526 | A1* | 12/2018 | Atsmon | G06T 19/003 |
| 2019/0011931 | A1* | 1/2019 | Selvam | G08G 1/202 |
| 2019/0311077 | A1* | 10/2019 | Watanabe | G06F 30/20 |
| 2020/0021497 | A1* | 1/2020 | Mathur | H04L 41/145 |
| 2020/0033866 | A1* | 1/2020 | Song | G06N 3/088 |
| 2020/0201357 | A1* | 6/2020 | Zeng | G08G 1/0133 |
| 2020/0211409 | A1 | 7/2020 | Latorre et al. | |
| 2020/0234582 | A1* | 7/2020 | Mintz | G08G 1/0145 |
| 2020/0334920 | A1 | 10/2020 | London et al. | |
| 2020/0409380 | A1* | 12/2020 | Song | B60W 50/06 |
| 2021/0019376 | A1* | 1/2021 | Neubauer | G08G 1/081 |
| 2021/0020038 | A1* | 1/2021 | Weldemariam | G08G 1/0112 |
| 2021/0158311 | A1* | 5/2021 | Hussaini | G07B 15/00 |
| 2021/0158688 | A1* | 5/2021 | Lau | H04W 4/44 |
| 2021/0201679 | A1* | 7/2021 | Kuwahara | G01C 21/3807 |
| 2021/0217307 | A1* | 7/2021 | Abdel-Aty | G08G 1/081 |
| 2021/0233394 | A1* | 7/2021 | Sakakibara | G08G 1/0145 |

FOREIGN PATENT DOCUMENTS

| | | | | |
|---|---|---|---|---|
| JP | 2007-219785 | A | 8/2007 | |
| JP | 2019133366 | A | 8/2019 | |
| KR | 20150067675 | A | * 6/2015 | ............. G06Q 50/30 |

OTHER PUBLICATIONS

Chun et al., "Virtual-Reality Based Integrated Traffic Simulation for Urban Planning", International Conference on Computer Science and Software Engineering, 2008, 4 pages.

Chao et al., "A Survey on Visual Traffic Simulation: Models, Evaluations, and Applications in Autonomous Driving" vol. 38 No. 2, 2019, 22 pages.

Goedicke et al., "VR-OOM: Virtual Reality On-road driving siMulation", DOI: https://doiorg/10.1145/3173574.3173739, Apr. 21-26, 2018, 11 pages.

Maroto et al., "Real-Time Traffic Simulation With a Microscopic Model", IEEE Transactions on Intelligent Transportation Systems, vol. 7, No. 4, Dec. 2006, pp. 513-527.

Wikkie et al., "Virtualized traffic at metropolitan scales", Frontiers in Robotics and AI vol. 2 Article 11, May 7, 2015, 10 pages.

Bayarri et al., "Driving Simulation", Communications of the ACM, vol. 39, No. 5, May 1996, 6 pages.

Decrescenzo, "Request for Technology—19-65 Congestion Pricing Alternative Technology," MTA Bridges and Tunnels, Mar. 28, 2019, 7 pages.

Non-Final Office Action received for U.S. Appl. No. 16/692,387 dated Nov. 24, 2021, 44 pages.

Non-Final Office Action received for U.S. Appl. No. 16/692,481 dated Sep. 24, 2021, 135 pages.

Final Office Action received for U.S. Appl. No. 16/692,481 dated Jan. 27, 2022, 79 pages.

Non-Final Office Action received for U.S. Appl. No. 16/692,481 dated May 26, 2022, 44 pages.

Ding, Heng, Zheng, Xiao-yan, Zhang, Yu, Zhu, Liang-yuan, and Zhang, Wei-hua, "Optimal Control for Traffic Congested Area Boundary in Macroscopic Traffic Network," Zhongguo Gonglu Xuebao/China Journal of Highway and Transport, vol. 30, No. 1, Jan. 2017, pp. 111-120.

Kobayashi et al., "Virtual Driving", pp. 336-347, Published 2009.

\* cited by examiner

TRAFFIC PATTERN DETECTION FOR CREATING A SIMULATED TRAFFIC ZONE EXPERIENCE

TECHNICAL FIELD

The subject application is related to wireless communication systems and traffic zones, and more particularly to using wireless communication systems and traffic management systems to provide a predicted traffic experience with respect to a user entering a traffic zone.

BACKGROUND

Congestion pricing/charging zones refer to certain roads in which vehicles are charged a fee for usage in an effort to reduce traffic congestion, reduce pollution and raise revenue. For example, Singapore and London have congestion pricing schemes for the use of certain roads. Other cities are considering similar schemes.

Driving in such zones can be (or when implemented will be) relatively expensive. A user has little knowledge of what will happen if a traffic congestion zone is entered, for example, whether there will be very slow traffic, whether another route might be faster, whether waiting is likely to provide a better result, and so forth. Before certain users who have choices decide on whether to pay the extra money to enter such a zone, the users would like to have such knowledge.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
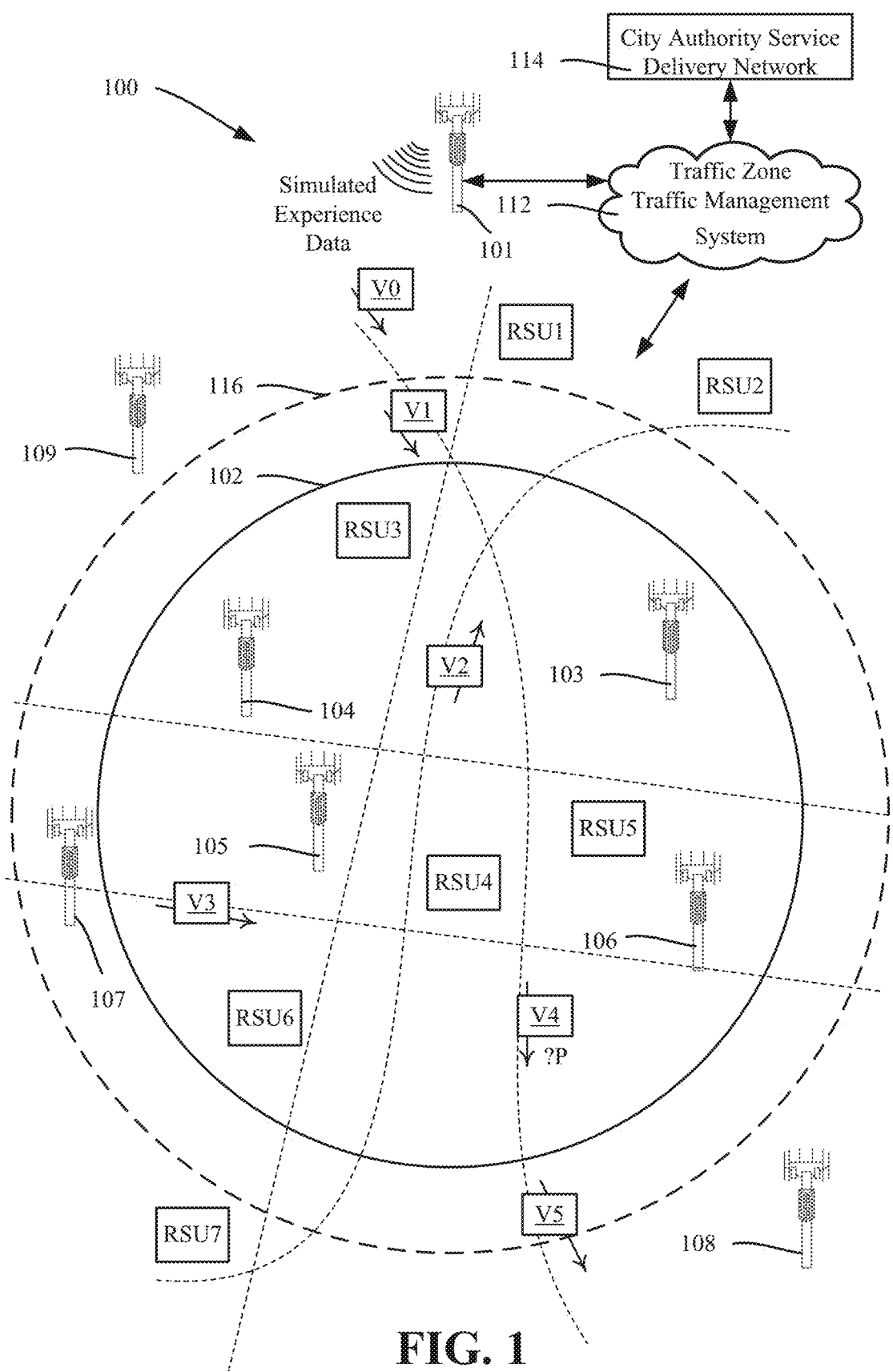
FIG. 1 illustrates an example traffic zone that uses a wireless communication system and vehicle sensors to provide a simulated virtual experience to a user device, in accordance with various aspects and implementations of the subject disclosure.

Briefly, one or more aspects of the technology described herein are generally directed towards providing a simulated user experience with respect to usage of a traffic zone. The simulated experience can be a visual representation of predicted traffic, predicted vehicle and/or pedestrian encounters, predicted times to destinations, estimated cost of entering, dwelling and exiting the traffic zone, and so forth.

The simulated visual representation can be a three-dimensional (3D) video rendering, a two-dimensional video rendering, and/or audible output. A rendering can be sped up in time, e.g., a ten-minute video rendering of the predicted traffic experience in real time can be shown in a minute, so as to not distract the driver. A map can be presented showing predicted times and traffic, for example; the map can be interactive to zoom in and/or navigate through a mapped area.

The simulated user experience of traffic zone usage can be current (as close to real time as possible), such as for a user approaching a traffic zone who wants to determine whether to enter. Current traffic data, along with historical data, can be used to make the prediction. Alternative routes can be recommended, including routes within the traffic zone or routes that bypass the traffic zone, at least in part.

The simulated user experience of traffic zone usage can be non-real time, such as minutes, hours or even days in the future. To this end, historical traffic data can be used to predict what a user is likely to encounter at a user-specified time, to assist users contemplating a trip into a traffic zone.

User-specific data, such as user preference data, can be used as part of the predicted experience. For example, a user preference setting or the like can specify avoiding routes where there is significant truck traffic and/or poor air quality. Another user preference setting can specify a time constraint to help avoid delay. Many other user user-specific/user-specified data can be factored into and/or presented in conjunction with (or output instead of) the virtual experience, including but not limited to air pressure (which affects medical conditions such as a user with asthma), temperature, weather, road conditions (snow, ice, rain, wind), allergy information and so forth that a user may want to consider before entering a defined zone.

Thus, aspects of the technology can detect traffic pattern in real time to create a virtual simulated (e.g., 3D) experience of traffic situation in a traffic zone before entering the traffic zone or paying any entry fees. This can be considered as giving the user an opportunity to "test drive" the predicted experience.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device," smart device," "user equipment," "mobile device equipment," "mobile station," "mobile," subscriber station," "access terminal," "terminal," "handset," "communication device," (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example system 100 comprising a traffic zone 102, such as for charging vehicles for usage. FIG. 1 illustrates the traffic zone 102 in the shape of a circle, which may be customized by a controlling entity such as a city. It should be noted that any area can be defined (to a reasonable accuracy) as a traffic zone, including a circle, oval, any regular or irregular polygon, as well as areas that include smaller exclusion or otherwise differing areas (such as a square block within a ten square block area). Moreover, a traffic zone can be changed (e.g., expanded or contracted) based on any criterion or criteria, such as time of day, amount of congestion, and so forth. Multiple traffic zones can be configured.

In FIG. 1, the closely dashed lines curved and straight lines represent roads on which any number of vehicles (six such vehicles V0-V5 are depicted) may be traveling or parked. Note that the vehicle direction is detected by the system and in FIG. 1 is represented by the respective arrow accompanying the respective block that represents a vehicle; the vehicle V4 was traveling in a certain direction but has not moved recently and thus is detected by the system 100 as likely being parked, as represented by the "?P" label in FIG. 1.

As will be understood, the technology is based on a wireless communication system, as represented in FIG. 1 via cell sites/base stations 102-109, that communicate with user equipments in the vehicles. Note that while nine such cell sites/base stations 101-109 are depicted, it is understood that any practical number of such sites may be present in a given scenario.

Roadside units RSU1-RSU7 (sometimes referred to as roadside equipment, or RSE; any practical number may be present in a given implementation) also work in conjunction with the cell sites/base stations 101-109 to detect a vehicle's location in the traffic zone or near the traffic zone. In general, the roadside units RSU1-RSU7 can detect and report the amount of traffic and the speed of traffic and general information regarding the type of vehicle data. If a vehicle includes a transponder device, more specific information regarding the vehicle type may be detected. Note that the roadside units RSU1-RSU7 may comprise edge gateway devices to facilitate faster operations and reduced data transmission for real time or near-real time system 100 operation.

In general, the cell sites/base stations 101-109 monitor the location of the vehicle, based on a user equipment (typically a driver's cell phone or a more dedicated wireless user equipment device such as a device within the vehicle) and thus can determine whether a vehicle is present within a defined traffic zone. It should be noted that global positioning systems (GPS) are useful, but do not provide a viable solution in many scenarios because, for example, GPS does not function well in "urban canyons" where traffic monitoring as described herein is most likely to be implemented. Further, not every user equipment has GPS capabilities, or often has GPS turned off. RSU detection and timing-based user equipment location can be used in such scenarios.

As shown in FIG. 1, the cell sites/base stations 101-109 and roadside units RSU1-RSU7 communicate with a traffic zone management system 112, which in turn communicates with a city (or other governmental such as county) authority service delivery network 114. Additional details of the traffic zone management system 112 and the city authority service delivery network 114 are described with reference to FIGS. 4 and 5.

Also shown in FIG. 1 is the concept of a warning zone 116. Vehicles detected in the warning zone 116 that are approaching the traffic zone 102 can be notified that they are about to enter the traffic zone 102, particularly for traffic zones that charge a price for vehicle operation therein. Thus, the approaching vehicle V1 receives such a warning, while the departed vehicle V5 does not. A user equipment within the vehicle can provide the warning, e.g., on a display and/or audibly, and can also show the estimated price for entering the zone 102. A displayed and/or audible message can be given to the user equipment in vehicle V5 indicating that the vehicle has left the zone, possibly along with the price charged.

As described herein, a user/vehicle approaching the warning zone 116 (such as the vehicle V0) or in the warning zone 116 (such as the vehicle V1) can request a simulated virtual experience that predicts and shows/describes what the user is likely to experience if the traffic zone 102 is entered. This helps a user decide on whether to proceed. Note that it is also feasible for a user already in the traffic zone 102 to request such a virtual experience, to help decide whether to exit the traffic zone 102 or take some alternative action (e.g., stop for lunch).

Figure 2:
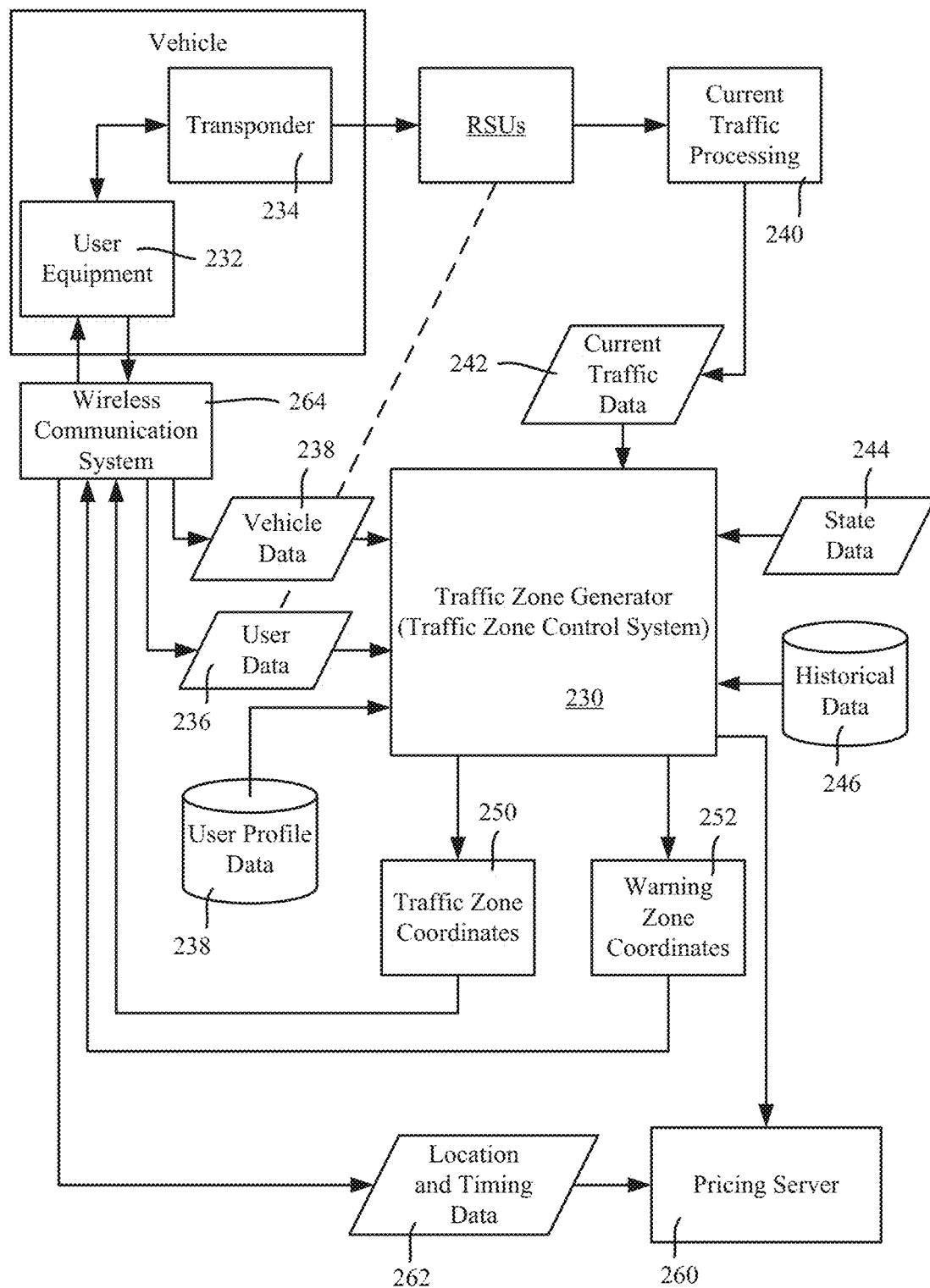
FIG. 2 is a block diagram representation of example components used to generate a traffic zone based on various possible example data, in accordance with various aspects and implementations of the subject disclosure.

Note that in one or more implementations, a traffic zone area and warning zone area can be fixed or dynamically established by outputting boundary coordinates to a user equipment; (for a circle and ellipse, a center point and radius or major/minor axis data, respectively, can be provided). Indeed, almost any number of criterion, combined or individually considered, can be used to create and/or modify a traffic zone. FIG. 2 shows some possible variables that can be considered by a traffic zone generator 230 component when generating a traffic zone, which can be per-user, per-group of users, per-vehicle and/or per group of vehicles.

For example, consider that a user equipment 232 couples with a transponder 234 and can thus report user-specific data (e.g., identity) and vehicle type data to the traffic zone generator 230. It should be noted that in one or more alternative implementations, the transponder can (e.g., directly or indirectly) provide the user identity data and vehicle information to the traffic zone generator via one or more of the RSUs.

The user data 236 can be used to access user profile data that can factor into pricing, e.g., subscriber data (such as prepaid or not), discount data (e.g., for students, residents, seniors, low income users and so on), authorized city employee or not, registered carpool user, rideshare provider, and so on. The vehicle data can be used to modify the pricing, e.g., electric, hybrid, gas, diesel, axles, length, commercial versus passenger, bus, taxi and so on.

Data from the roadside units (RSUs) can be used by a current traffic processing component 240 to determine current traffic data 242, including average current speed and the number of vehicles, which indicate a current level of traffic congestion. Note that such information can also come from the user equipments that are active in the system.

State data 244 including dynamic information such as time of day, day of week, whether an event is taking place, where any construction is taking place and so forth may be used by the traffic zone generator 230. Static (or semi-static) state data such as road classification (e.g., highway, main thoroughfare, side street, boulevard, one-way street) and zoning can be used, as well as revenue models.

Historical data 246, which can include third party data such as obtained from rideshare services, can be used to predict congestion and the like, such as to configure a traffic zone so as to start charging in that traffic zone before actual congestion occurs, which will thereby reduce traffic. In addition to historical sensor data related to vehicle traffic, historical data 246 can include pedestrian data, bicycle data, number of parked cars, and so forth. Such historical data 246 can be per road, per intersection, per time of day, and so on. Historical data 246 also can be used to predict revenue, e.g., to determine a daily or hourly rate, as well as configure one or more traffic zones to predictably reduce expected traffic to a desired amount but not so much that too little revenue is collected.

With the above information, the traffic zone generator 230 can determine and output traffic zone coordinates 250 (or the like) and warning zone coordinates 252 (or the like) to the user equipment 232. Any of the information available to and output by the traffic zone generator 230 can also be provided to a pricing server 260 to determine the appropriate financial charge to apply to the user based on location and timing data 262 provided to the billing engine 260 by the wireless communications system 264.

Note that dwelling time within the traffic zone is one possible billing criterion, e.g., the longer a user and vehicle remain in the traffic zone, such as beyond a threshold time, the higher the amount billed. This, for example, can deter a rideshare vehicle from remaining in a congested traffic zone for an inordinate amount of time.

It should be noted that backup systems can be used for users/vehicles that do not have a user equipment or transponder, and to ensure that a user does not deactivate (e.g., turn off or shield) a user equipment or transponder. For example, cameras can be used to capture license plate images at select locations, with a higher price charged for such non-participating vehicles.

Thus, variable zone pricing can be defined based on real time and historical traffic data. A traffic zone control system collects, from sensors, the traffic average speed, traffic volume (number of vehicles/hour or other time unit), traffic density, lane occupancy (e.g., percentage), vehicle length (for vehicle classification), length of queue at an intersection, and when a vehicle is driving in the wrong direction (e.g., on a one-way street), and sends to an intelligent pricing server 460 (FIG. 4) for real time zone financial charges. Customizable pricing can be modified based on subscriber profile data.

The technology described herein leverages a wireless communications network to broadcast area cordoning boundary data to RSUs and smart connected devices. Note that smart phone applications can communicate with RSUs via near field communications techniques, whereby dependency on network coverage is not needed in such a scenario.

Figure 3:
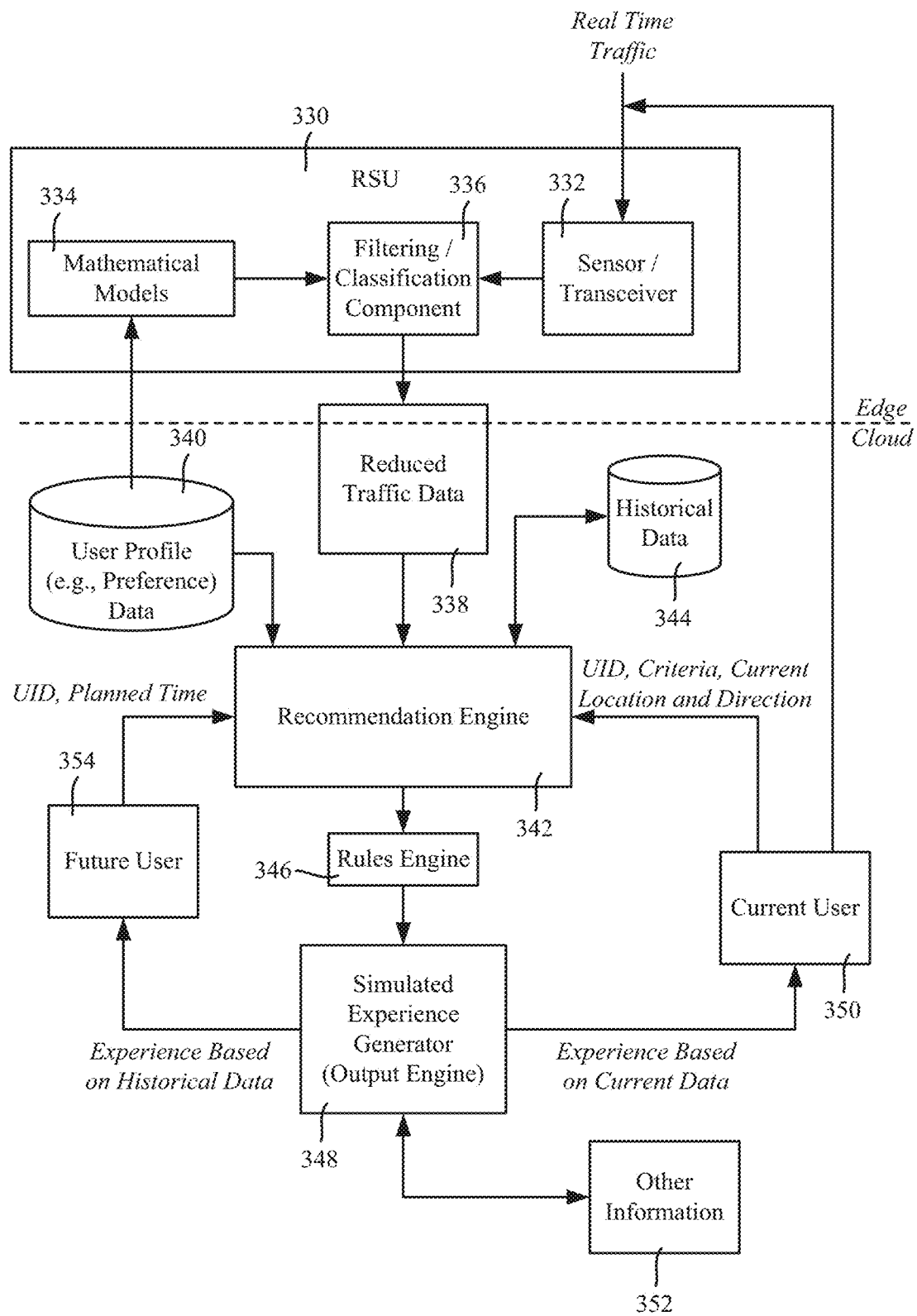
FIG. 3 is a block diagram representation of example components used to generate a simulated virtual experience based on various data, in accordance with various aspects and implementations of the subject disclosure FIGS. 4 and 5 comprise a block diagram representation of example components showing show how a traffic zone traffic management system can communicate with a city authority service delivery network and integrate with city endpoints with respect to a traffic zone, in accordance with various aspects and implementations of the subject disclosure.

With respect to a simulated traffic experience, FIG. 3 shows a number of example components and data that can be used to predict, generate and output a requested simulated traffic experience, which can be user-specific to an individual user or group of users. In one or more implementations, a road side unit (RSU) 330 as represented by block 332 senses real-time traffic at via sensors, along with transceivers that can communicate with vehicle transponders and/or receivers in properly equipped vehicles, for example. This sensed information, including but not limited to speed, number of vehicles and vehicle type information is referred to herein as traffic metadata.

In order to operate more efficiently and provide better accuracy, in one or more implementations one or more machine-learned mathematical models 334 are developed using historical data and embedded in the road side unit 330, which can be considered edge gateways. In this alternative, the mathematical models are used by a filtering and/or classification component 336 to filter and/or classify the traffic metadata into a significantly reduced amount of traffic data 338. More particularly, having such mathematical models at the roadside units, which can be different models customized for different sensors, respectively, eliminates the need for sending redundant data, basically instead sending traffic metadata deltas/anomalies to the traffic management system operating in a centralized "cloud" or the like. This edge computing solution facilitates faster and more realistic and accurate simulated experiences based on more current data. Notwithstanding, other alternatives, including having cloud servers receive and process the actual data are feasible.

Attributes of the sensory data can be modified before being sent to the traffic management servers. For example, a percentage value representing the amount of semi-trailer truck traffic can be sent, rather than sending individual truck data, that is, forty vehicles per minute have passed RSU4, ten percent of which were semi-trailer trucks. In this way, users who do not like to drive while a lot of truck traffic is present can be notified. Note that user profile data 340 (e.g., preference data) can be used in learning the mathematical models 334 to facilitate such attribute modification. Further, note that security keys or the like can be implemented in the road side units and the traffic management system to encrypt/decrypt the content.

In the example of FIG. 3, the reduced traffic data 338 is received by a recommendation engine 342, which can combine the reduced traffic data 338 with historical data 344 to develop a more complete representation of the current traffic situation. The recommendation engine can update the historical data 344, which, for example, can be used for subsequent traffic estimation as well as updating the mathematical models. The traffic data is further processed by the recommendation engine 342 using user-specific data (profiles and preferences) as well as with dynamic parameters (e.g., whether the user qualifies for a zone pricing discount or carpool lanes) received from the user's/vehicles. Note that historical data can also include information such as expected pedestrian traffic, parking availability, and so forth).

The user profile data 340 can be used by the recommendation engine 342 and a rules engine 346 and to determine whether a simulated traffic experience is to be generated (block 348), as doing so if not needed unnecessarily consumes resources. By way of example, consider that a current user 340 has indicated (via criteria provided to the recommendation engine along with the user's identity and current location and direction data) that he needs to get to a point in the traffic zone within fifteen minutes and would like a simulated virtual experience. The recommendation engine 342 data processing determines that the current traffic situation cannot get the user 340 there in time by any route. Instead of triggering the generating of the simulated virtual experience, the recommendation engine can indicate to the rules engine 346 that the user's criteria cannot be met, and thereby respond with a message indicating the issue rather than providing the requested simulated virtual experience. Whether to provide a requested simulated virtual experience or not can be determined based on any other criterion, such as more truck traffic than the user's preference data indicates is acceptable, more carbon monoxide than the user's preference data indicates is acceptable, and so on. A user can modify or override such preference data settings to receive a simulated virtual experience.

If instead the preference criterion or criteria is met such that the desired output is detected, the recommendation engine 342 triggers the rules engine 346 in the network to run the simulated experience generator (output engine) to create the virtualized 3D version of the Zone experience. A feedback loop can be applied in real time to create the desired results. In this way, the current user 350 can receive the experience (e.g., via the wireless network) based on relatively very current traffic data, and thereby make an informed decision as to how to proceed.

In this way, a user/subscriber can view a virtualized (e.g., 3D graphical video) representation of the traffic pattern, inducing for example, expected price, the number of vehicles, types of vehicles, greenhouse gas index, traveling speed in near real time as the sensor data is weaved into the virtualized experience. Note that a user device can also have an application or the like that maintains some static or semi-static data such as road images, vehicle type images and so forth so that the amount of downloaded experience data can be reduced to only send changes (e.g., coordinates and types of other vehicles) relative to the semi-static data.

Other information 352 such as advertising, weather reports, incident reports and so forth may be presented in conjunction with the simulated traffic experience. The other information can be user-specific and tailored to a user based on the user's preference data, user profile or the like.

A traffic zone is not limited to city roads and highways or the like. In addition, building sensors for a parking garage, sensors for venues/convention centers state fairs or amusement parks can also be used to help define a traffic zone. A user's profile data preference data can be used to create machine-learned models that can be implemented in any of these other sensors.

There are various ways to monetize the above system, including monthly subscription charges, a one-time fee, a per-usage fee, purchase of an application, advertising revenue, and so forth. At the same time, no pre-provisioning of an account or pre-payment or the like is needed. For example, if a user/subscriber decides to proceed with entering the traffic zone, the user can opt in with a one-time payment via SMS or other means, and can have an option to pay via a digital wallet or create an account.

It is feasible for the predicted experience to differ from the actual experience, and therefore be different from a user's expectations. In one implementation, a user can exit the traffic zone within a "grace period" for example, indicate dissatisfaction and get some type of credit, such as a digital credit towards an online purchase, a credit for downloadable content or streaming audio/video, a digital coupon used towards a restaurant discount, and so on.

Another usage of the simulated virtual experience technology is to predict an experience in the more distant future. To this end, a future user 354 can provide a user identifier (UID) and a planned time (and if appropriate a certain destination in the traffic zone). Using historical data, as well as possibly other data (such as planned construction), a virtual experience can be generated for a future user. Thus, for example, a user at 10 am who is considering entering a traffic zone at 1 pm can view a predicted virtual experience of what to expect. If not particularly desirable, the user can vary the time and try again. In this way, user can then make a more informed decision, e.g., wait until 2 pm and save five dollars in tolling as well as save eight minutes of travel time. Note that such a prediction is not as accurate as a near real time prediction, (and thus likely would not qualify for credits if the user experience is not as expected), but still assists a user in making an informed decision when planning a trip.

Figure 4:
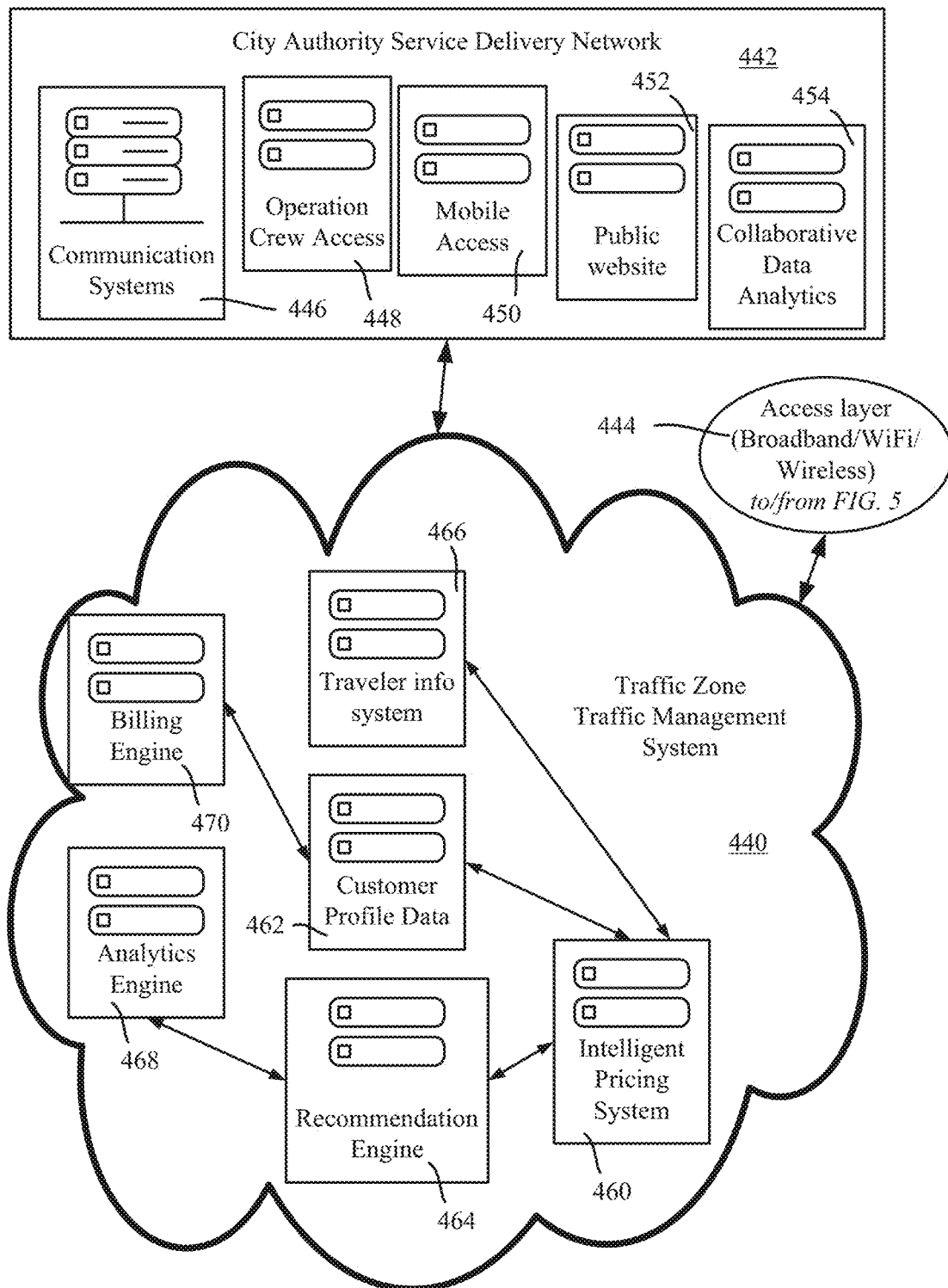
Figure 5:
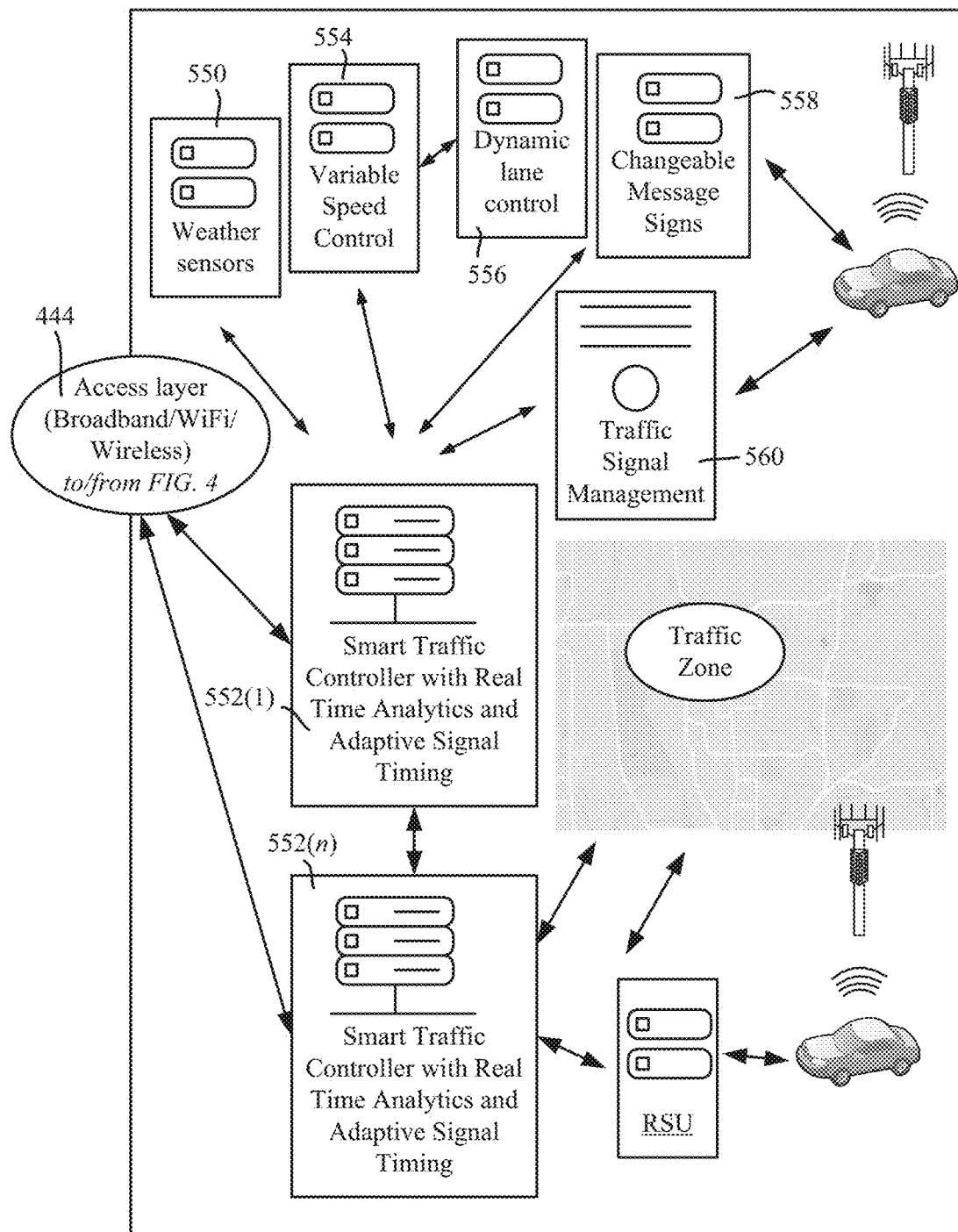

FIGS. 4 and 5 provide additional details of traffic zone traffic management system 440, and related components including a city authority service delivery network 442. The traffic zone traffic management system 440 couples to various city endpoints 550 (FIG. 5) via an access layer 444, which can be a broadband, Wi-Fi, wireless (e.g., 5G) link, or any combination thereof.

A typical example city authority service delivery network 442 includes communication systems 446, operation crew access 448, mobile access 450 such as for users' traffic-related mobile device application(s), a public website 450 (e.g., that provides traffic camera sites, user billing review and payments and so forth), and collaborative data analytics 454, which can analyze traffic patterns and the like based on traffic information obtained by the city directly and/or from third parties such as compiled by rideshare services.

In one or more implementations, the traffic zone traffic management system 440 "cloud" includes an intelligent pricing system 460 (such as the pricing server of FIG. 3) that can determine pricing based on the various variable information including the customizable zone and the user profile data 338/customer profile data store and data servers 462. A recommendation engine 464 can be used to recommend alternative routes and the like to users in the customizable traffic zone as well as those users about to enter the traffic zone. A traveler information system 466 can provide users with other travel-related information. An analytics engine 468 can be used to process and analyze collected data, such as for use by the recommendation engine 464.

A billing engine 470 can determine and apply bills to customers based on their customer profile data along with other factors described herein and the price determined by the intelligent pricing system for a configured traffic zone and a user's use thereof.

FIG. 5 shows how via the network access layer 444 the traffic zone traffic management system 440 can integrate with existing infrastructure including various city endpoints. Typical example city endpoints can comprise weather sensors 550 that provide weather information that can be processed by smart traffic controllers with real time analytics and adaptive signal timing. Smart traffic controllers 552(1)-552(n) are depicted, and it can be readily appreciated that any practical number may be present. Note that in one or more implementations, such smart traffic controllers 552(1)-552(n) comprise edge gateway devices (as opposed to operating in the cloud) in order to reduce latency and communication of large amounts of data and thereby provide faster real time operation, decision making, and so forth.

The smart traffic controllers 552(1)-552(n), which obtain feedback from specified sensors, perform real time analytics that can be used to control various traffic-related devices, such as variable speed control devices 554, dynamic lane control devices 556, changeable message signs 558, and traffic signal management 560.

In addition to integrating with existing infrastructure, the smart traffic controllers 552(1)-552(n) also integrate with customizable traffic zones as described herein, including to receive traffic zone-related information from and provide traffic zone-related information to one or more RSUs 562, to and from the wireless communication system in general (e.g., to send pricing and other messages to user equipments), and, for example, to change relevant changeable message signs 558 to indicate the current price of a customizable traffic zone (e.g., notwithstanding any discounts).

Figure 6:
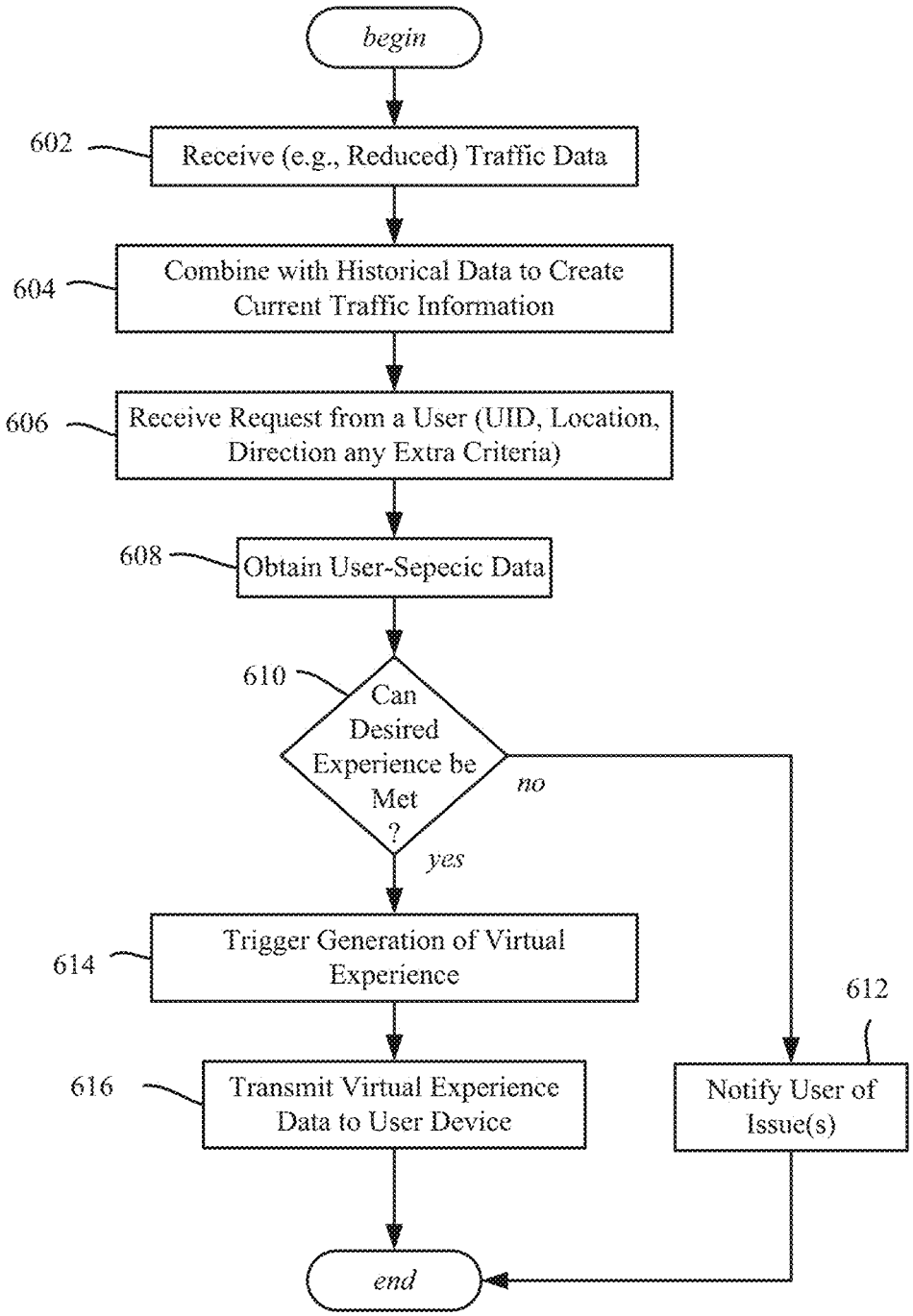
FIG. 6 illustrates a flow diagram of example operations of a traffic zone management system to generate a simulated virtual experience, in accordance with various aspects and implementations of the subject disclosure.

The flow diagram of example operations of FIG. 6 summarize various aspects of the technology in one or more implementations. At operation 602, the reduced traffic data is received on a regular basis from the various sensors as described herein. This information is combined with historical data at operation 604 to construct the current traffic information. Note that the current traffic information is useful for other purposes beyond a simulated virtual experience, including, for example, to modify a traffic zone, change zone pricing, and so forth.

At operation 606 a traffic zone management and control system receives a request for a simulated virtual experience. In this example, consider that the request is from a current user, and thus for accuracy, as to as possible to real time data is desired. The user device provides user/vehicle identification, location information, direction information and also can specify any other criterion as entered by a user, such as a time limit for getting to a destination.

Operation 608 obtains the user-specific data, such as user preferences not necessarily indicated by the user device, but instead associated with the user on a permanent basis until changed by the user. Non-limiting examples of such user-specific data can include a preference to avoid trucks (e.g., as a percentage of vehicles), a preference to avoid heavy traffic (e.g., number of vehicles per road), a preference to avoid pollution above a certain limit, a preference to use certain roads and avoid others, weather, road conditions, air pressure, and so on.

Operation 610 represents a determination of whether the user's desired experience can be met, e.g., the user can reach a desired destination in twenty-five minutes or less and air pollution is below the user's specified limit. If not, operation 612 notifies the user of the issues, e.g., via text and/or audio messaging, and thus avoids the generation of the simulated virtual experience, thereby conserving resources while avoiding the user viewing an experience that does not meet the user's specified requirements.

If instead the desired experience can be met (according to a prediction). Operation 614 triggers the virtual experience generation. Operation 616 transmits the data to the user device that facilitates presenting the user experience on the user device. The presentation can be shown in 3D graphics, 2D graphics, in actual time, slow motion, fast motion, an annotated mapping, output via audio, and so forth. The output can be based on user preferences and/or modified by user interaction with the output device.

In this way, the user can make an informed decision on whether to enter a traffic zone, including based on price, time, traffic density, and other possible information such as vehicle types, parking availability, pedestrian traffic, air quality, and so forth.

Figure 7:
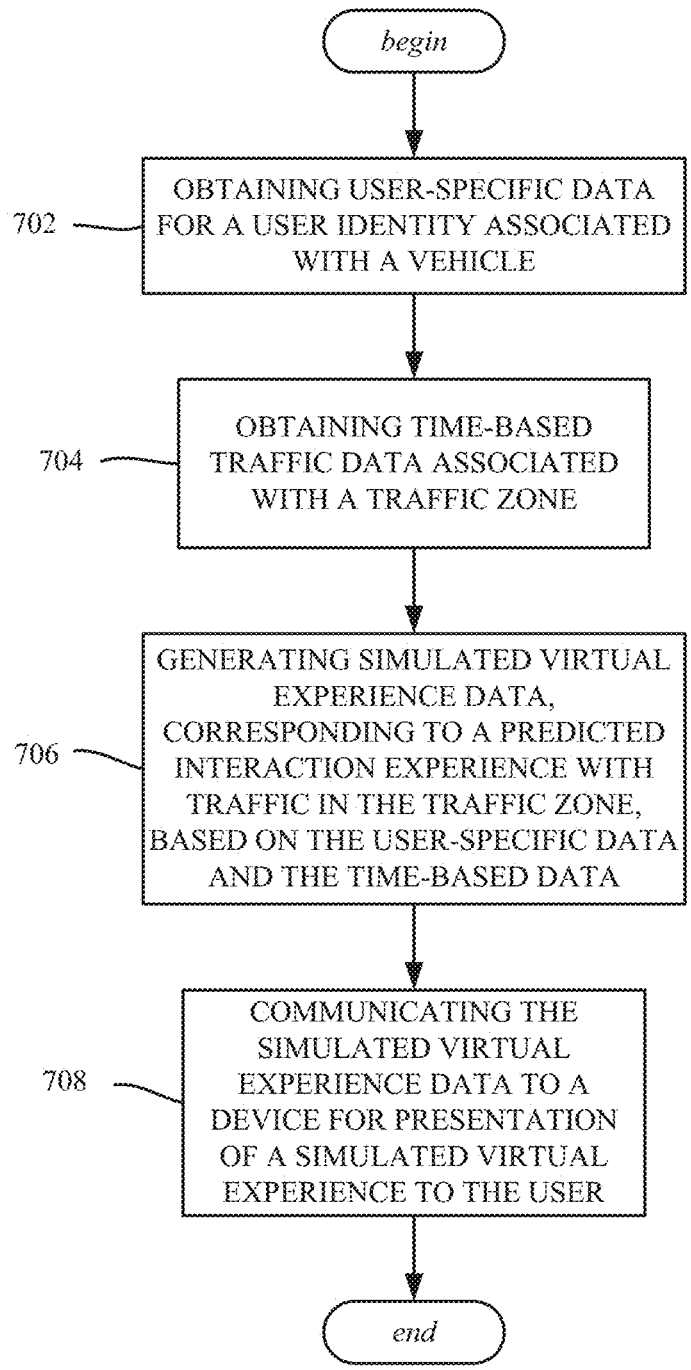
FIG. 7 illustrates a flow diagram of example operations related to generating a simulated virtual experience, in accordance with various aspects and implementations of the subject disclosure.

One or more aspects are generally represented in FIG. 7, and can correspond to system comprising a processor and a memory that stores executable instructions that, when executed by the processor, facilitate performance of operations. Example operation 702 represents obtaining user-specific data for a user identity associated with a vehicle. Example operation 704 represents obtaining time-based traffic data associated with a traffic zone. Example operation 706 represents generating simulated virtual experience data, corresponding to a predicted interaction experience with traffic in the traffic zone, based on the user-specific data and the time-based data. Example operation 708 represents communicating the simulated virtual experience data to a device for presentation of a simulated virtual experience to the user.

Obtaining the time-based traffic data can comprise receiving reduced data from a traffic sensor.

Further operations can comprise embedding modeling data that is based on historical traffic data, in the traffic sensor, to facilitate the receiving the reduced data from the traffic sensor.

The time-based data can comprise current data that is processed to obtain the simulated virtual experience data relative to a current time. The time-based data can comprise historical data that is processed to obtain the simulated virtual experience data relative to a future time.

The user-specific data can comprise information directed to avoidance of other traffic. The user-specific data can comprise information directed to avoidance of: a type of traffic or an emission level.

Further operations can comprise predicting, based on the user-specific data and the time-based data, estimated pricing data corresponding to the simulated virtual experience, and outputting the estimated pricing data.

Further operations can comprise issuing a credit to the vehicle occupant in response to the simulated virtual experience can comprise by a threshold criterion from an actual experience in the traffic zone.

Presenting the simulated virtual experience occurs in response to a triggering rule being satisfied.

The user-specific data can comprise a variable parameter corresponding to a traffic zone discount. The user-specific data can comprise a variable parameter corresponding to at least one of: user identity information, carpool eligibility or urgency information.

Further operations can comprise guiding the user to a desired route relative to the traffic-related zone based on the user-specific data.

Figure 8:
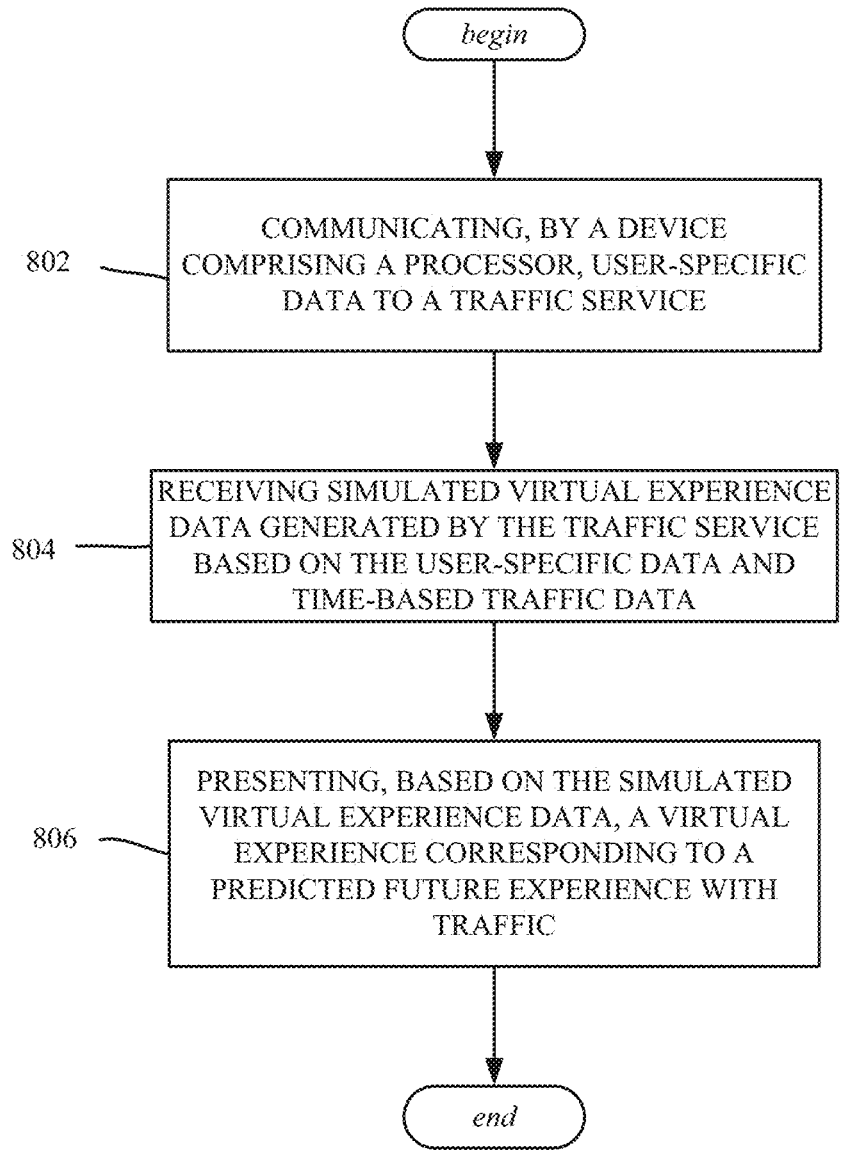
FIG. 8 illustrates a flow diagram of example operations related to obtaining and presenting a simulated virtual experience on a user device, in accordance with various aspects and implementations of the subject disclosure.

One or more aspects are generally represented in FIG. 8, and can correspond to a method, e.g., of example operations. Operation 802 represents communicating, by a device comprising a processor, user-specific data to a traffic service. Operation 804 represents receiving simulated virtual experience data generated by the traffic service based on the user-specific data and time-based traffic data. Operation 806 represents presenting, based on the simulated virtual experience data, a virtual experience corresponding to a predicted future experience with traffic.

Presenting the virtual experience can comprise outputting a three-dimensional visual rendering to a display device. Presenting the virtual experience can comprise outputting a visual rendering to a display device, in which the visual rendering is sped up relative to the predicted experience.

Figure 9:
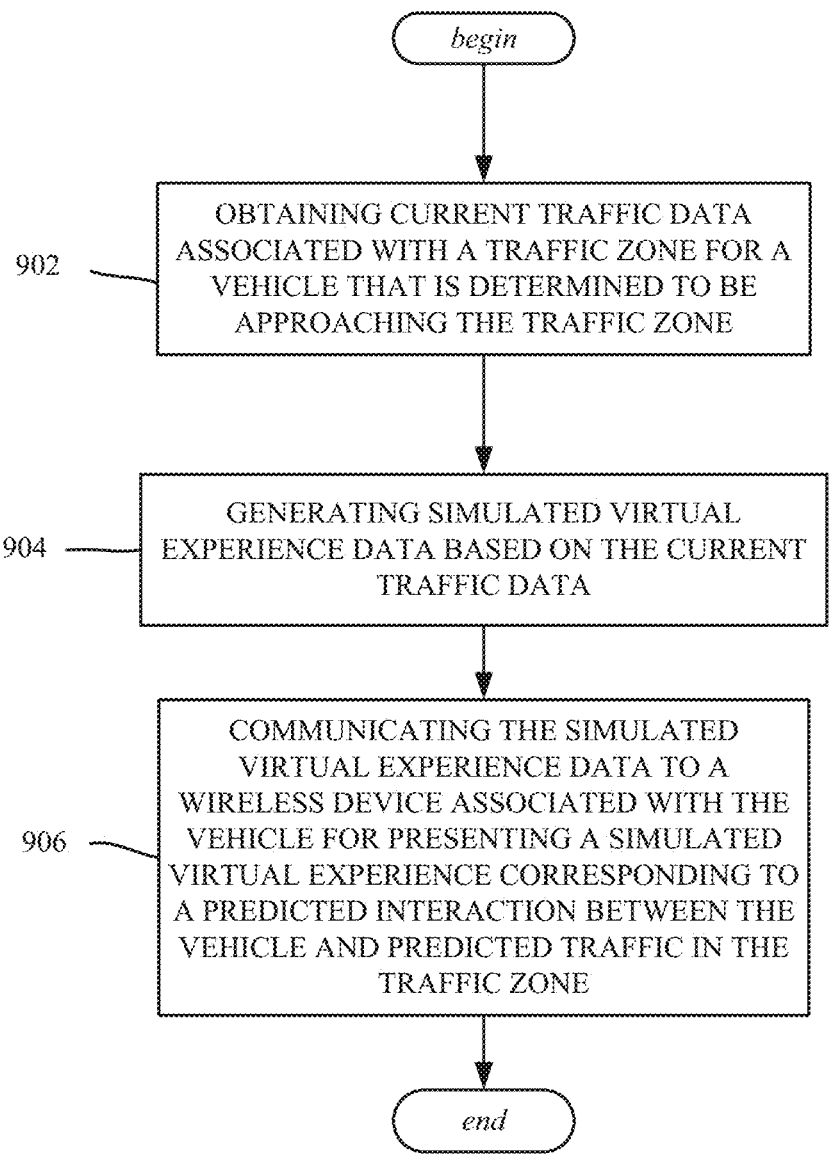
FIG. 9 illustrates a flow diagram of example operations related to generating a simulated virtual experience based on various data, in accordance with various aspects and implementations of the subject disclosure.

One or more aspects are represented in FIG. 9, and can correspond to operations, e.g., of a machine-readable storage medium, comprising executable instructions that, when executed by a processor facilitate performance of the operations. Example operation 902 represents obtaining current traffic data associated with a traffic zone for a vehicle that is determined to be approaching the traffic zone. Example operation 904 represents generating simulated virtual experience data based on the current traffic data. Example operation 906 represents communicating the simulated virtual experience data to a wireless device associated with the vehicle for presenting a simulated virtual experience corresponding to a predicted interaction between the vehicle and predicted traffic in the traffic zone.

Further operations can comprise receiving user-specific data, and determining predicted billing data based on the user-specific data and the simulated virtual experience data.

Further operations can comprise embedding modeling data that is based on historical traffic data, in a traffic sensor, and wherein the obtaining the current traffic data comprises receiving reduced data that is filtered or classified via the modeling data from the traffic sensor.

Generating the simulated virtual experience data based on the current traffic data can comprise generating three-dimensional visual rendering data.

As can be seen, the technology operates independent of access networks (Wifi/3GPP/Broadband) and regardless of wireless carriers that the sensor devices are using. With the technology, there is no need for a pre-provisioned account. User privacy is avoided by not using cameras to take pictures of car license plates (until the user enters the zone and the user is otherwise paying for traffic zone usage), in part because the technology is based on the location or proximity of the user in relations to a traffic zone. The user only needs an application on a mobile device to regularly get device data and present a simulated experience. In this way, users can "test drive" the experience before entry into a traffic zone, and can get credits if the expectation is not met.

Figure 10:
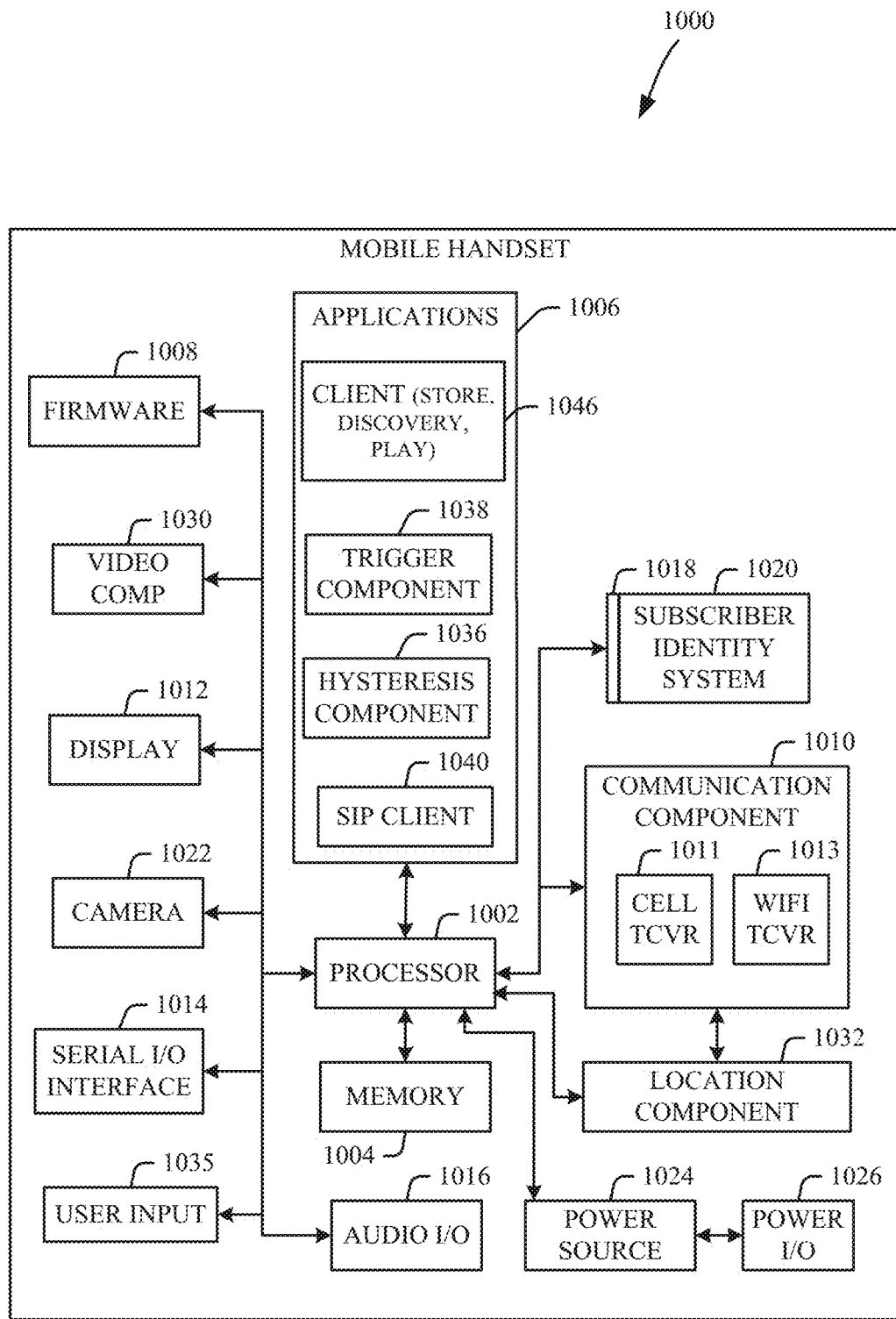
FIG. 10 illustrates an example block diagram of an example mobile handset operable to engage in a system architecture that facilitates wireless communications according to one or more embodiments described herein.

Referring now to FIG. 10, illustrated is a schematic block diagram of an example end-user device such as a user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
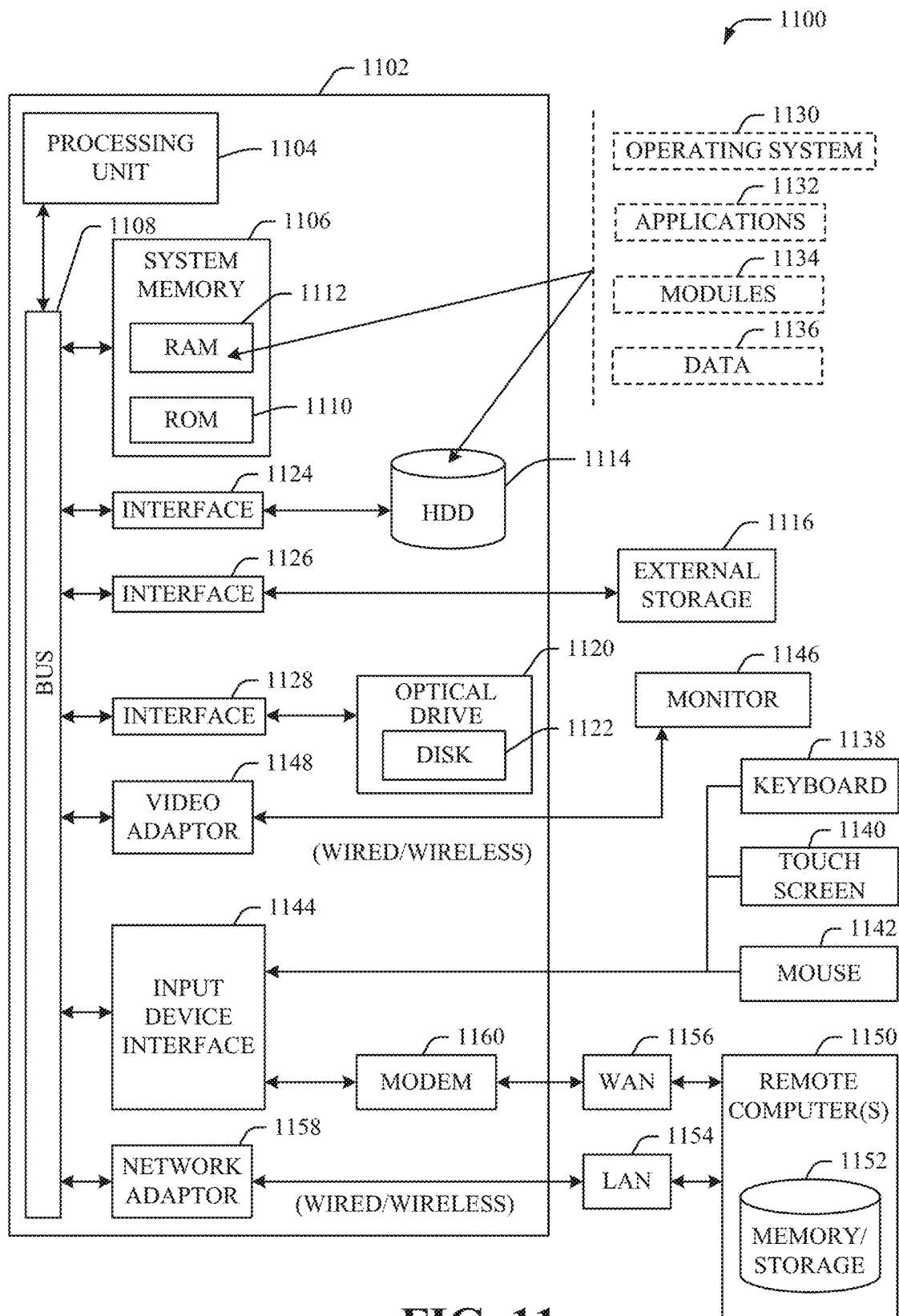
FIG. 11 illustrates an example block diagram of an example computer operable to engage in a system architecture that facilitates wireless communications according to one or more embodiments described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the technology described herein can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s)

1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1094 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
a processor; and
a memory that stores executable instructions that, when executed by the processor, facilitate performance of operations, the operations comprising:
obtaining user-specific data for a user identity associated with a vehicle;
obtaining time-based traffic data associated with a traffic zone that comprises a warning zone surrounding the traffic zone;
in response to the vehicle entering the warning zone, generating simulated virtual experience data, corresponding to a predicted interaction experience of the vehicle with traffic and air pollution in the traffic zone during a predicted time range that the vehicle will traverse the traffic zone, based on the user-specific data and the time-based traffic data, wherein the time-based traffic data comprises air pollution data associated with roads in the traffic zone; and
communicating the simulated virtual experience data to a device for presentation of a simulated virtual experience to the user identity.

2. The system of claim 1, wherein the obtaining the time-based traffic data comprises receiving reduced data from a traffic sensor.

3. The system of claim 2, wherein the operations further comprise, embedding modeling data that is based on historical traffic data, in the traffic sensor, to facilitate the receiving the reduced data from the traffic sensor.

4. The system of claim 1, wherein the time-based traffic data comprises current data that is processed to obtain the simulated virtual experience data relative to a current time.

5. The system of claim 1, wherein the time-based traffic data comprises historical data that is processed to obtain the simulated virtual experience data relative to the predicted time range.

6. The system of claim 1, wherein the user-specific data comprises information directed to avoidance of other traffic.

7. The system of claim 1, wherein the user-specific data comprises information directed to avoidance of: a type of traffic or an air pollution level.

8. The system of claim 1, wherein the operations further comprise predicting, based on the user-specific data and the time-based traffic data, estimated pricing data corresponding to the simulated virtual experience, and outputting the estimated pricing data.

9. The system of claim 1, wherein the operations further comprise issuing a credit to the user identity in response to the simulated virtual experience differing by a threshold criterion from an actual experience in the traffic zone.

10. The system of claim 1, wherein the presenting the simulated virtual experience occurs in response to a triggering rule being satisfied.

11. The system of claim 1, wherein the user-specific data comprises a variable parameter corresponding to a traffic zone discount.

12. The system of claim 1, wherein the user-specific data comprises a variable parameter corresponding to at least one of: user identity information, carpool eligibility or urgency information.

13. The system of claim 1, wherein the operations further comprise guiding the user identity to a desired route relative to the traffic based on the user-specific data.

14. A method, comprising:
in response to a vehicle entering a warning zone surrounding a congestion pricing zone, communicating, by a device comprising a processor, user-specific data to a traffic service;
receiving, by the device, simulated virtual experience data generated by the traffic service based on the user-specific data and time-based traffic data, wherein the simulated virtual experience data is based on a predicted time that the vehicle will enter the congestion pricing zone, and wherein the simulated virtual experience data comprises air pollution data associated with areas in the congestion pricing zone; and
presenting, by the device, based on the simulated virtual experience data, a virtual experience corresponding to a predicted future experience of the vehicle with traffic and air pollution in the congestion pricing zone.

15. The method of claim 14, wherein the presenting the virtual experience comprises outputting a three-dimensional visual rendering to a display device.

16. The method of claim 14, wherein the presenting the virtual experience comprises outputting a visual rendering to a display device, and wherein the visual rendering is sped up relative to the predicted future experience.

17. A non-transitory machine-readable medium, comprising executable instructions that, when executed by a processor facilitate performance of operations, the operations comprising:
obtaining current traffic data associated with a traffic zone for a vehicle that is determined to have entered a warning zone associated with the traffic zone;
generating simulated virtual experience data based on the current traffic data, wherein the simulated virtual experience data comprises air pollution data associated with traffic in the traffic zone; and
communicating the simulated virtual experience data to a wireless device associated with the vehicle for presenting a simulated virtual experience corresponding to a predicted interaction between the vehicle and predicted traffic and air pollution in the traffic zone during a predicted time range that the vehicle will occupy the traffic zone.

18. The non-transitory machine-readable medium of claim 17, wherein the operations further comprise receiving user-specific data, and determining predicted billing data based on the user-specific data and the simulated virtual experience data.

19. The non-transitory machine-readable medium of claim 17, wherein the operations further comprise, embedding modeling data that is based on historical traffic data, in a traffic sensor, and wherein the obtaining the current traffic data comprises receiving reduced data that is filtered or classified via the modeling data from the traffic sensor.

20. The non-transitory machine-readable medium of claim 17, wherein the generating the simulated virtual experience data based on the current traffic data comprises generating three-dimensional visual rendering data.

* * * * *